UNITED STATES PATENT OFFICE.

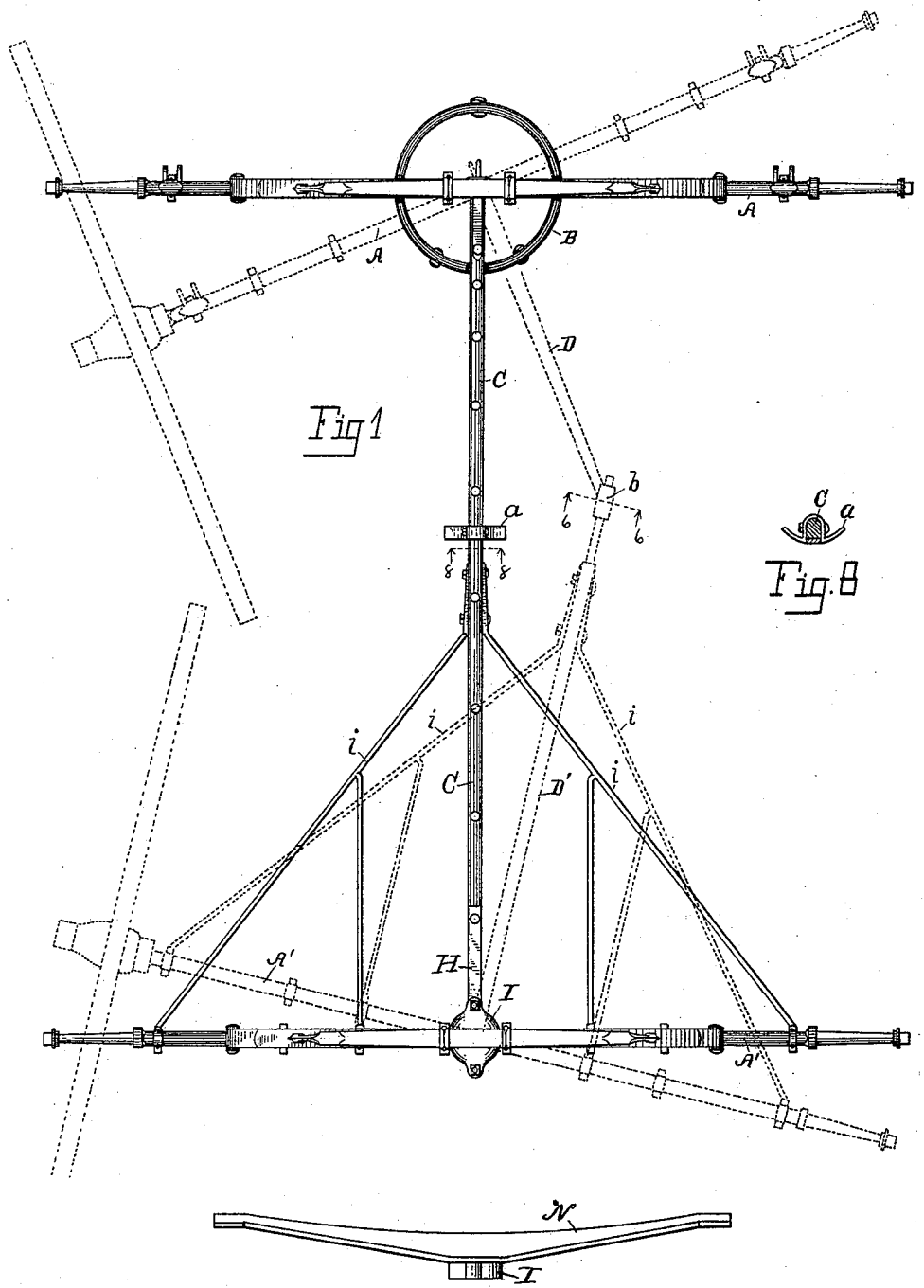

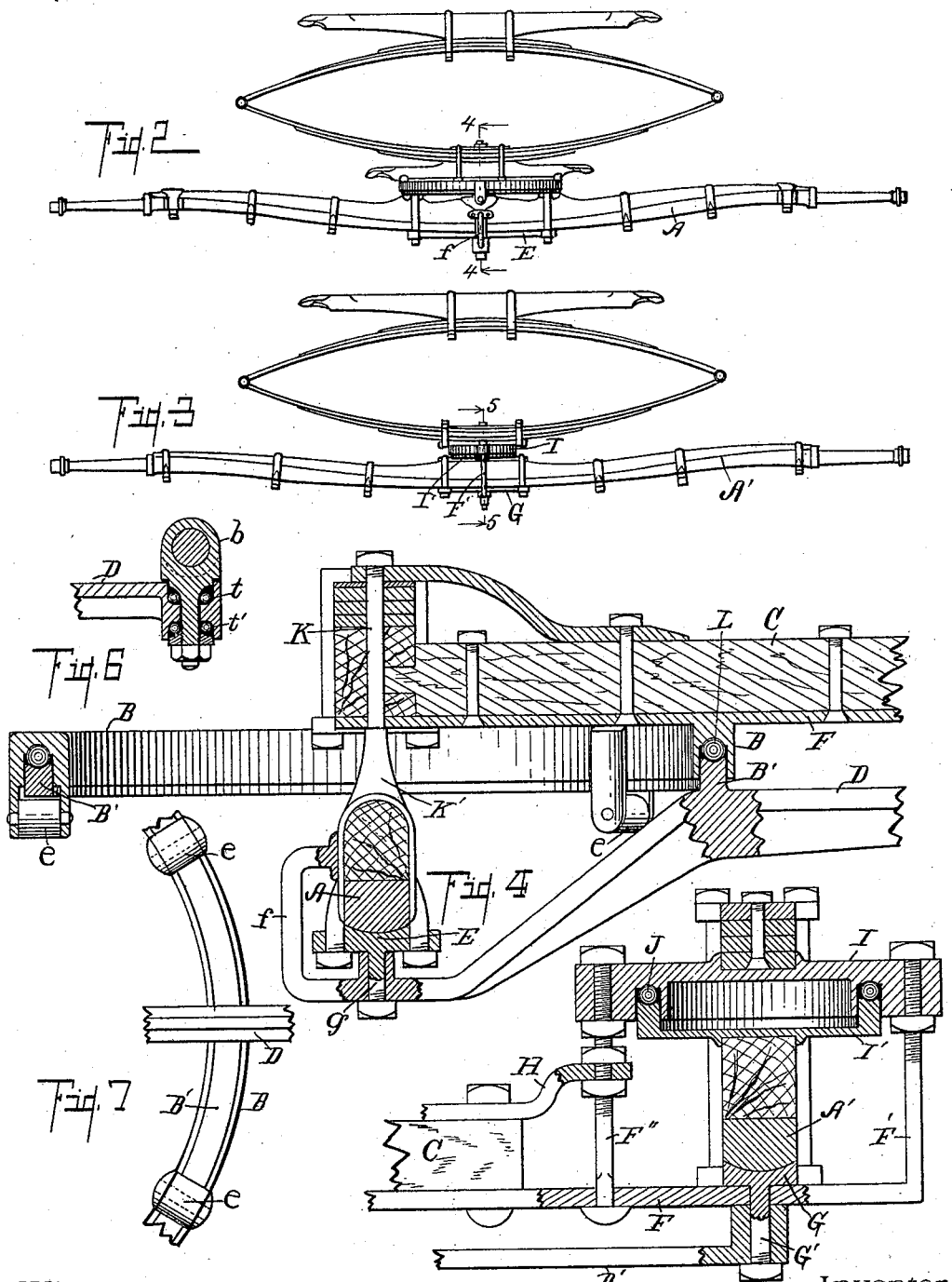

CHARLES F. BURNS, OF KALAMAZOO, MICHIGAN.

VEHICLE RUNNING-GEAR.

SPECIFICATION forming part of Letters Patent No. 619,539, dated February 14, 1899.

Application filed November 2, 1897. Serial No. 657,203. (No model.)

*To all whom it may concern:*

Be it known that I, CHARLES F. BURNS, a citizen of the United States, residing at the city of Kalamazoo, in the county of Kalamazoo and State of Michigan, have invented certain new and useful Improvements in Running-Gears for Vehicles, of which the following is a specification.

My invention relates to improvements in vehicles, and more particularly to the running-gear of light vehicles or carriages, though the structure can be used on heavy vehicles and wagons.

The objects of my invention are to provide an improved light vehicle-gear in which both the front and rear axles shift their relation to the box in turning, so that the vehicle can be turned around in a smaller space than otherwise; second, to cause the rear and hind wheels to lap by each other when the vehicle is cramped; third, to provide a suitable stop to prevent the wheels rubbing against the side of the box in turning and so dispense with rub-irons on the sides of the body; fourth, to provide an improved ball-bearing for the gears, and further objects appearing in the detailed description to follow. I accomplish these objects by the mechanism described in this specification, definitely pointed out in the claims, and shown in the accompanying drawings, in which—

Figure 1 is a top plan view of my improved vehicle-gear, the body and wheels not being shown. Fig. 2 is a front elevation of the same. Fig. 3 is a rear elevation of the same. Fig. 4 is an enlarged sectional view in detail of the front coupling and circles on line 4 4 of Fig. 2. Fig. 5 is an enlarged sectional view in detail of the rear coupling on line 5 5 of Fig. 3. Fig. 6 is an enlarged sectional view on line 6 6 of Fig. 1, showing the pivoted collar between arms D and D' from the under side. Fig. 7 is a detail of a part of the lower front circle B'. Fig. 8 is a sectional view of reach C, taken on line 8 8, Fig. 1, showing the guide that insures the free passage of the arms. Fig. 9 shows an arm N to substitute for the spring over the rear axle where side springs or platform-springs are employed. All sectional views are taken looking in the direction of the arrows.

Similar letters of reference refer to similar parts throughout the several views.

Both the front axle A and the rear axle A are pivoted to turn independent of the springs and head-blocks at each end. The head-blocks and springs of front and rear are rigidly secured together by reach C and carry the body above.

From the front axle A and adapted to turn with it an arm D projects back about two-fifths of the distance to the rear axle. A similar arm D' projects forward from the rear axle toward the front. The ends of the arms D and D' are united by a pivoted sliding collar having a journal with ball-bearings on arm D and slipping on the rounded end of arm D'. The arms D and D' being rigidly attached to the axles, it is clear that when the forward gear is cramped the rear gear will be cramped in the opposite direction, so that a much shorter turn can be made than where only the forward axle swings on the circles. Also, this is of great advantage in making room to get in and out of the vehicle. If the arms D and D' were equal, the edge of the wheels would strike each other in the ordinary carriage. By making the forward arm D shorter the wheels still lap by each other, as shown by the dotted lines in Fig. 1, thus making a shorter turn possible. I am aware that vehicles have been made on a plan similar to this before; but the arms D and D' have not been proportioned to allow the wheels to lap, which is important in making short turns, and no ball-bearings have been provided. I have also very much improved the manner of attaching and pivoting the parts, reducing the size very much without sacrificing the strength. The arm D is attached to the forward axle by being bolted securely to the circle-plate B' or by being integral therewith and by bolt g at the under side of the axle and is extended into loop f, the top of which is fastened to the front side of axle A. The reach C is mortised into the head-block above and is secured to the upper circle-plate B by clips or by other means. A clip E surrounds the axle and is attached by bolts below. The king-bolt K projects up from the clip through the head-blocks and under half of the front springs. Extending down to each side of circle B' from circle B are ears which carry rollers e to guide and hold the rings together. The circle B is grooved and circle B' fits within the same. Each is provided with ball-races, and antifriction-balls L are between the two. The circle B slides in the guides thus formed till one of the rollers e is reached, which limits the motion, and thus prevent the wheels rubbing on the body of the vehicle. The device would work well with the balls between if not special races or grooves were provided. Thus the rub-irons are dispensed with.

The arm D is attached to the rear axle by a center-bolt G' and the braces i. A plate I', having ball-races on top, and a plate I, with ball-races on its under side corresponding to the ball-races in plate I', are secured to the end of the reach C. Suitable bearing-balls J are in the ball-races. The plate I is also securely bolted to the springs by clip-plates. The bar F from the under side of reach C passes under the axle A. The bolt G' passes through the same and also through arm D'. The bar F is adapted to revolve on bolt G.' The bar F is turned up at the end at F' and is secured by nuts to the top plate I. A strap H projects from the top of the reach. A bolt F''' passes through the bar F and strap H in front of axle A'. The bolt F''' and the perpendicular part F' are a little distance from the axle A', so that the parts can turn without striking. Toward the middle of the reach C a curved guard-plate is bolted, so that the arms D and D' cannot strike the sides of the reach when turning.

In using my improved construction on three-springed buggies or platform-wagons arm N (see Fig. 9) is substituted for the springs.

The construction is readily adapted to vehicles having no springs. The ball-bearings are adapted to any circles.

The details of construction of my improved vehicle can be greatly varied and still embody my invention, as must appear to those skilled in the art.

Having thus described my invention, what I claim as new, and desire to secure by Letters Patent, is—

1. In a vehicle the rear axle and forward axle each pivoted at their centers, the axles each being provided with ball-bearing circles at the centers, in combination with rigid arms attached to each of the same and projecting toward each other and united at the center by a sliding joint, and a reach above rigidly attaching the bolsters, head-block and springs of front and rear gears the upper parts of which are provided with circles having ball-races corresponding to those of the axles together for the purpose specified.

2. In a vehicle having both axles pivoted, an arm from the rear axle projecting forward and uniting by a sliding joint to an arm on the forward axle projecting backward in combination with a curved guard a on the reach adapted to prevent the arms striking the sides of the reach.

3. In a vehicle the arm D secured to circle B, the circle and arm both being securely attached to the front axle in combination with the reach C, secured to circle B, the circle B and reach being united to the head-blocks and springs, the axle and head-block being united by king-bolt R and the circles by guide e, the arm D uniting by a sliding joint to an arm projecting forward from a pivoted rear axle provided with a ball-bearing circle, for the purpose specified.

4. In a vehicle, the rear axle securely united by bolt G' and braces i, to arm D' and a reach C having braces H and F having bearings to engage pintles below the reach, and ball-bearing circle-plates above, the brace H bearing the head-blocks and rear spring and bolster, the arm D uniting by a sliding joint to a rearwardly-projecting arm from front axle, all combined, for the purpose specified.

5. In a vehicle running-gear the combination of the circle B grooved with projecting ears on its periphery and an inside circle to fit within the groove; antifriction-balls between the circles; and rollers supported on bearing-pins through the ears for the purpose specified.

In witness whereof I have hereunto set my hand and seal in the presence of two witnesses.

CHARLES F. BURNS. [L. S.]

Witnesses:
LELA M. BROWN,
OTIS A. EARL.